April 7, 1942.  J. F. LUHRS  2,279,255
SPECIFIC GRAVITY MEASUREMENT DEVICE
Original Filed Nov. 16, 1938
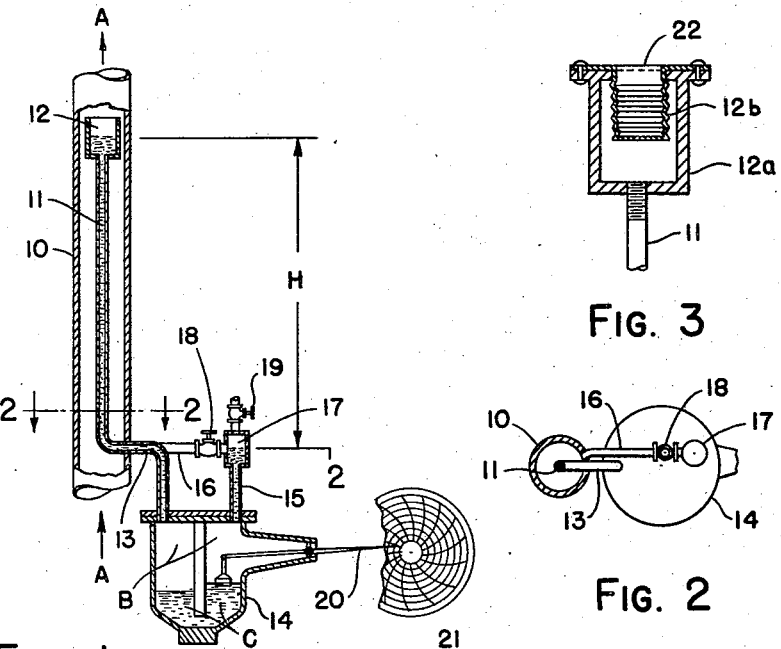
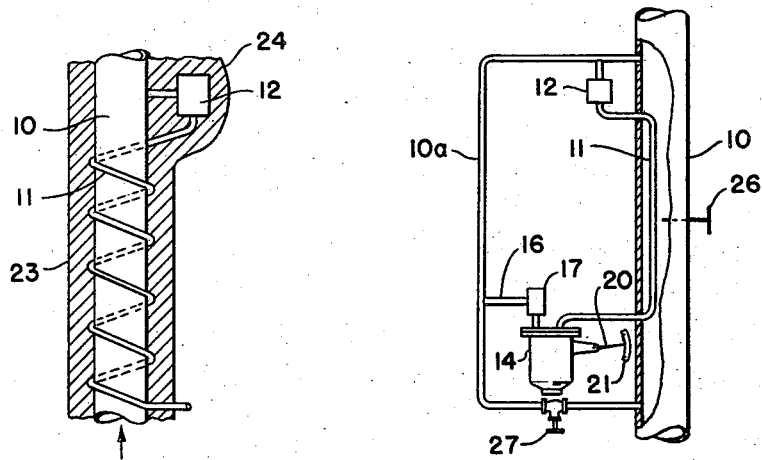
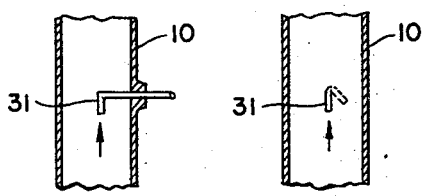
INVENTOR
JOHN F. LUHRS
BY Raymond W. Junkins
ATTORNEY Patented Apr. 7, 1942

2,279,255

UNITED STATES PATENT OFFICE 2,279,255

SPECIFIC GRAVITY MEASURING DEVICE

John F. Luhrs, Cleveland Heights, Ohio, assignor to Bailey Meter Company, a corporation of Delaware Original application November 16, 1938, Serial No. 240,599½. Divided and this application May 6, 1940, Serial No. 333,524

2 Claims. (Cl. 265—44)

This application is a division of Irwin and Luhrs application Serial No. 240,599½, filed November 16, 1938.

The present invention relates generally to an apparatus for determining the properties of a fluid, and more particularly to an apparatus for continuously determining the in situ specific gravity of a flowing fluid undergoing a change or conversion.

In the processing of flowing fluids, it is frequently desirable for control purposes to have a continuous record or indication of the in situ specific gravity of the fluid, without withdrawing a sample and determining its properties by means of a hydrometer, Westphal balance, or other laboratory methods applicable to withdrawn samples. The periodic determination of specific gravity of a withdrawn sample is a difficult and expensive operation in any case, and of little or no value as far as indicating the corresponding property of the fluid in its flowing condition, especially when dealing with fluids at temperatures and pressures which are materially different from atmospheric conditions. In addition, such cold sampling procedures are not applicable for the determination of the in situ properties of fluid mixtures which are not stable at atmospheric conditions. Thus, the mixture may be rapidly undergoing a change or conversion with the result that the character of the analyzed sample would materially differ from that of the sample at the instant of its withdrawal. Likewise, the fluid in its flowing state might comprise a mixture of gas, vapor and liquid, in which case the analysis of a withdrawn sample would fail to indicate the specific gravity of the fluid under the conditions obtaining in the flowing stream. For these and other reasons, it is highly desirable to employ a technique and apparatus which is capable of reflecting the in situ specific gravity of the flowing fluid stream, and thereby afford a continuous indication or record of the fluid properties under actual flowing conditions.

One of the objects of the present invention is to provide an apparatus for determining the in situ specific gravity of a fluid under flowing conditions.

Another object is to provide an apparatus for determining the in situ properties of a fluid undergoing a change or conversion while flowing in the form of a stream.

Another object is an apparatus for determining the in situ specific gravity of a flowing fluid, which is applicable not only to liquids or gases or vapors, but also to mixtures thereof.

The foregoing objects may be accomplished in accordance with the present invention, one aspect of which includes an apparatus which continuously compares the weight per unit area of a vertical column of a fluid, the specific gravity of which is to be determined, with the weight per unit area of a column of a standard fluid of known density or specific gravity, the standard or reference fluid being maintained at the same temperature as the fluid whose specific gravity is being determined.

In order more clearly to disclose the nature of the present invention, reference is made to the accompanying drawing wherein several illustrative forms of the apparatus contemplated by the present invention are diagrammatically shown. It should be understood, however, that the present invention is by no means restricted to the embodiment hereinafter more particularly described, the drawing being merely illustrative of the principles involved.

Referring generally to the drawing,

Figure 1 is a sectional elevation of a simple form of apparatus in accordance with the present invention, the conduit for the reference fluid being centraly disposed within the conduit for the main fluid stream, in this embodiment.

Fig. 2 is a fragmentary cross-sectional view along the line 2—2 of Fig. 1.

Fig. 3 is a cross sectional view of a modified form of sealing pot which may be used where the reference fluid is miscible with the fluid whose specific gravity is to be determined.

Fig. 4 is a view partly in section and partly in elevation of a modified form of the invention wherein the connecting line is spirally wound around the main fluid conduit.

Fig. 5 is a view partly in section and partly in elevation of a modified form of the invention which may be used when the velocity of flow through the main conduit is high.

Fig. 6 is an enlarged sectional elevation showing a side view of a modified form of nipple.

Fig. 7 is an enlarged sectional view showing an end view of the nipple of Fig. 6, in a changed position.

Referring now generally to Figs. 1 and 2, illustrating a preferred embodiment of the present invention, the stream of a fluid A is pumped or flows through a vertical conduit 10. The velocity of flow through conduit 10 is maintained approximately constant by any suitable means (not shown) well known in the art, and at a sufficiently low rate to avoid friction loss and the development of a substantial pressure drop in the section of the conduit indicated by the letter H.

Centrally disposed in the main vertical conduit 10 is a smaller conduit 11, the top of which is provided with an enlarged cup 12, to provide a sealing means. The lower end of conduit 11 passes through a sealed opening in the wall of the larger conduit 10, and connects through line 13 with one leg of a U-tube or manometer 14 containing a sealing liquid C, such as mercury, for example. The opposite leg of the U-tube 14 is connected by conduit 15 to tap-off connection 16, sealing means 17 being interposed between conduits 15 and 16. A valve 18 is placed in line 15 if desired. Conduits 11, 13, 16, and 15, and the upper portion of each leg of the U-tube 14, are filled with a reference or standard fluid B which is preferably immiscible with the fluid A, under the conditions prevailing in column 10. A static head of fluid B is exerted on both sides of the U-tube or manometer 14, above the sealing fluid C. The position of the indicator arm 20 positioned by a float in one leg of the U-tube with reference to chart or scale 21 is determined by the relative position of the sealing liquid C. Since the reference fluid B is maintained at the same temperature as the fluid A, the scale or chart 21 may be calibrated to read specific gravity.

Fig. 3 shows a sealing pot which may be used in lieu of that shown in Fig. 1, where the reference fluid B is miscible with the fluid A whose specific gravity is to be determined. The sealing pot includes an expansible thin-wall bellows 12b, which is sealed in the opening in the top of the pot 12a. Fluid A enters through the opening 22, while fluid B flows in and out of conduit 11.

Fig. 4 shows an alternative scheme for maintaining the conduit 11 at the same temperature as the flowing fluid A. According to this embodiment the connecting line 11 is spirally wrapped around the outer wall of conduit 10, a lagging 23 being placed around the tap-off connection 24, the sealing pot 12, and the spirally disposed line 11, to maintain the temperature of the fluid in the connecting line 11 substantially at the temperature of the fluid within the conduit 10.

Fig. 5 shows an embodiment adapted for use when the velocity of the fluid flowing through the vertical conduit 10 is relatively high, a portion of the fluid being by-passed through conduit 10a by maintaining a pressure drop across an adjustable valve 26, the flow through the by-pass being regulated by valve 27. The upper connecting conduit 11 connects to by-pass 10a and is disposed within the main conduit 10, in order to maintain the reference fluid at the temperature of the main stream. The other tap-off connection is likewise taken off from the by-pass 10a.

The remainder of the parts are similar to those shown in Fig. 1.

In Figs. 6 and 7 is shown a modified form of nipple which may be used at the upper connection in Fig. 4, for example, to compensate for pressure drop due to friction loss if the rate of flow of the fluid through column 10 is too great. In general, the pressure drop can be minimized to a substantial degree by controlling the rate of flow of the fluid therethrough and by employing a large diameter conduit for column 10. The modified form of nipple shown in Figs. 6 and 7 may also be employed to this end, either with or without the use of a large diameter conduit. As shown in Fig. 6, the head 31 of the nipple is bent to receive part of the velocity head. This velocity head varies substantially as the square of the velocity of flow, and the friction loss varies accordingly. It will therefore be seen that as the velocity of flow increases, giving a greater pressure drop between the connections, the pressure at the upper connection would likewise increase, thereby compensating for this increase in pressure drop. As shown in Fig. 7, this nipple may be adjusted so that the increase in velocity head may be made to correspond exactly to the increase in pressure drop. With the nipple 31 pointing downstream, full velocity head will of course be attained. If, however, the nipple is rotated, the per cent of velocity head would be decreased so that at 90° there would be substantially no velocity head impressed on the other connection. By flowing a fluid of constant density through the pipe, but at different velocities, the nipple may be adjusted so that, regardless of such change in velocity, the recording or indicating arm 20 remains at the correct reading. In this manner variations caused by friction loss may be overcome.

By specific gravity I mean the relative density of a substance as compared with some standard substance, i. e. the ratio of the mass of a certain volume to the mass of an equal volume of a standard at some reference temperature.

To obtain accurate specific gravity measurements, the reference fluid B should have the same coefficient of expansion as the flowing fluid A whose specific gravity it is desired to determine. For this purpose a mixture of glycerin and water, for example, may be used, inasmuch as by varying the percentages of each of these constituents it is possible to obtain a mixture having the same coefficient of expansion as practically any known fluid. Accordingly, by employing a liquid B in the connecting lines having the same coefficient of expansion as fluid A, and maintaining the connecting lines at the same temperature as that of fluid A, the apparatus will provide sensitive means for indicating or recording variations in the specific gravity of the fluid in the conduit wherein changes are likely to occur.

In the foregoing detailed description it is apparent that many variations may be made without departing from the spirit and scope of the invention. I therefore intend to be restricted only in accordance with the following claims.

What I claim as new, and desire to secure by Letters Patent of the United States, is:

1. Apparatus for continuously determining the specific gravity of a given portion of a vertically flowing liquid stream confined in a conduit comprising means forming a column of reference liquid having the same coefficient of expansion as the liquid stream, means external to the flowing stream adapted to continuously compare the weight per unit area of the portion of the vertical column of the liquid stream with the weight per unit area of an equal length vertical column of the reference liquid having the same coefficient of expansion as the liquid stream, said means including a U-tube, one leg of which is connected to the said liquid stream in said conduit and the other leg thereof is connected to the bottom of the column of reference liquid, and means tending to keep the temperature of the two columns being compared uniform.

2. Apparatus for continuously determining the specific gravity of a flowing confined liquid stream comprising, means forming a stationary column of reference liquid having substantially the same specific gravity as the flowing stream, means adapted to continuously compare the weight per unit area of a vertical column of the fluid stream with the weight per unit area of an equal length vertical column of said stationary reference liquid having substantially the same specific gravity as the flowing stream, the two said columns being maintained at the same temperature, and means compensating for variations in velocity of the flowing stream, said means comprising a by-pass line joining spaced points of said fluid stream and communicating with the top of said vertical column.

JOHN F. LUHRS.